United States Patent [19]

Paul

[11] Patent Number: 4,631,583

[45] Date of Patent: Dec. 23, 1986

[54] VIDICON IMAGE MOTION COMPENSATION TECHNIQUE

[75] Inventor: Mark O. Paul, Costa Mesa, Calif.

[73] Assignee: Northrop Corporation, Hawthorne, Calif.

[21] Appl. No.: 695,659

[22] Filed: Jan. 28, 1985

[51] Int. Cl.$^4$ ............................................... H04N 7/18
[52] U.S. Cl. ............................... 358/125; 250/203 CT
[58] Field of Search ................. 358/125, 126, 93, 109, 358/113; 250/203 CT, 203 R; 356/247, 248, 253; 382/66

[56] References Cited

U.S. PATENT DOCUMENTS

| | | | |
|---|---|---|---|
| 3,566,353 | 2/1971 | Gray | 382/66 |
| 3,693,013 | 9/1972 | Dueker | 358/125 X |
| 3,761,612 | 9/1973 | Alpers | 250/203 CT X |
| 3,953,669 | 4/1976 | Saccomani et al. | 250/203 CT X |
| 4,286,289 | 8/1981 | Ottesen et al. | 358/125 |

*Primary Examiner*—Howard W. Britton
*Assistant Examiner*—Victor R. Kostak
*Attorney, Agent, or Firm*—Terry J. Anderson; Robert B. Block

[57] ABSTRACT

In a laser video imaging system, fiducial marks serving as reference points are physically applied to the faceplate of a video camera so that the fiducial marks become recorded on the observed scene. A boresight reticle produced by system electronics maintains a fixed relationship with the fiducial marks so that the reticle appears in proper superposition over an observed target, even when line-of-sight errors are introduced by extraneous influences.

11 Claims, 11 Drawing Figures

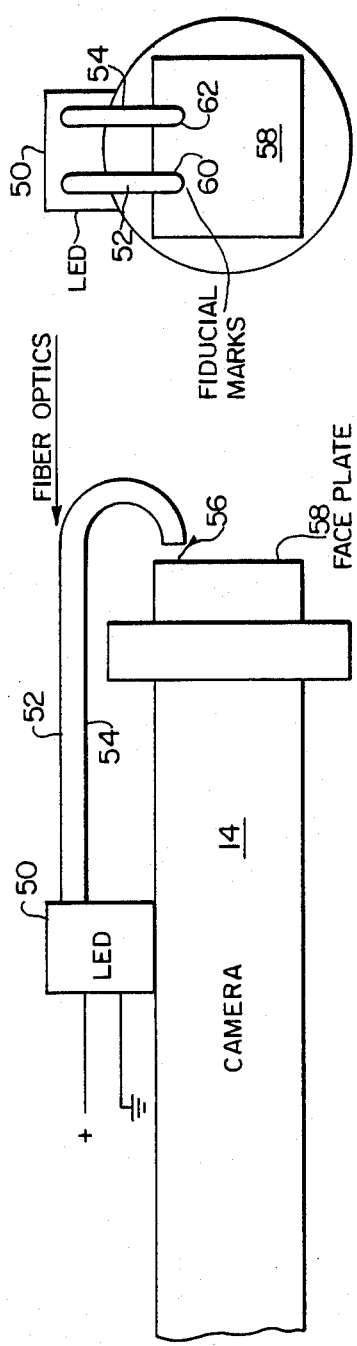
FIG. 3A
FIG. 3B
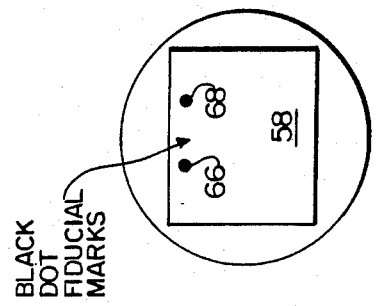
FIG. 3D
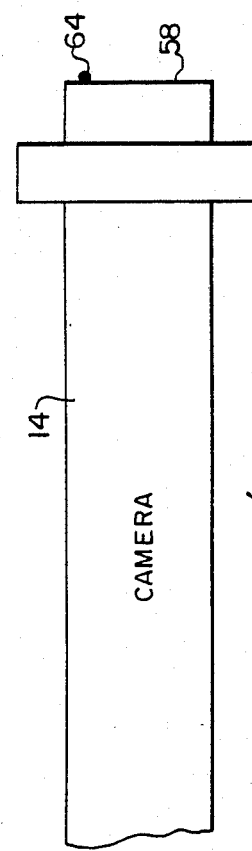
FIG. 3C

VIDICON IMAGE MOTION COMPENSATION TECHNIQUE

BRIEF DESCRIPTION OF THE PRESENT INVENTION

The present invention relates to video imaging systems and more particularly to a laser illuminated video imaging system for weapon boresights.

BACKGROUND OF THE INVENTION

A conventional weapon control system uses a laser source for illuminating a target. The illuminated target is tracked by means of electronic video tracking circuits. A boresight for the weapon control system takes the form of a video display wherein the laser illuminated target is displayed in superposition with reticle cross hairs. The reticle is generated by a symbol generator in accordance with data received from the video tracker and represents the position of the laser beam within a scene.

A significant problem with this type of imaging system occurs when ambient influences, such as strong ambient magnetic fields causes a shifting of the image as picked up by a television camera which follows the illuminated target. This is due to the effect of the magnetic fields on the deflection circuits of the camera. Since reticle generation is not affected by these fields, the reticle will not appear in superposition over an illuminated target, although in reality it should do so. Accordingly, line-of-sight errors become manifest to a weapon control operator.

Accordingly, there is a great need for compensating for the displaced erroneous movement of a target or image due to these extraneous environmental factors, such as strong magnetic fields.

BRIEF DESCRIPTION OF THE INVENTION

The present invention relies upon fiducial marks or reference points, which are physically applied to the faceplate of the camera so that, throughout operation of the system, the reticle maintains a precise displacement relative to the fiducial marks. Since the fiducial marks, physically appearing on the faceplate of the camera, will be shifted along with the image when boresight errors occur due to strong external magnetic fields, referencing the reticle to the fiducial marks will logically maintain a proper displacement between the reticle and the illuminated image or target.

Thus, the weapon control operator sees the reticle properly superimposed upon a tracked image even though the image and superimposed reticle are shifted from the center of a video display.

BRIEF DESCRIPTION OF THE FIGURES

The above-mentioned objects and advantages of the present invention will be more clearly understood when considered in conjunction with the accompanying drawings, in which:

FIG. 3A is a side elevational diagrammatic view of the invention indicating generation of fiducial marks on the faceplate of a camera by fiber optics;

FIG. 3B is an end view of the camera faceplate as shown in FIG. 3A;

FIG. 3C is a view similar to that of FIG. 3A but with the fiducial marks painted on a faceplate;

FIG. 3D is a view similar to that of FIG. 3B showing an end view of the faceplate with the fiducial marks painted thereon.

DETAILED DESCRIPTION OF THE INVENTION

Figure 1:
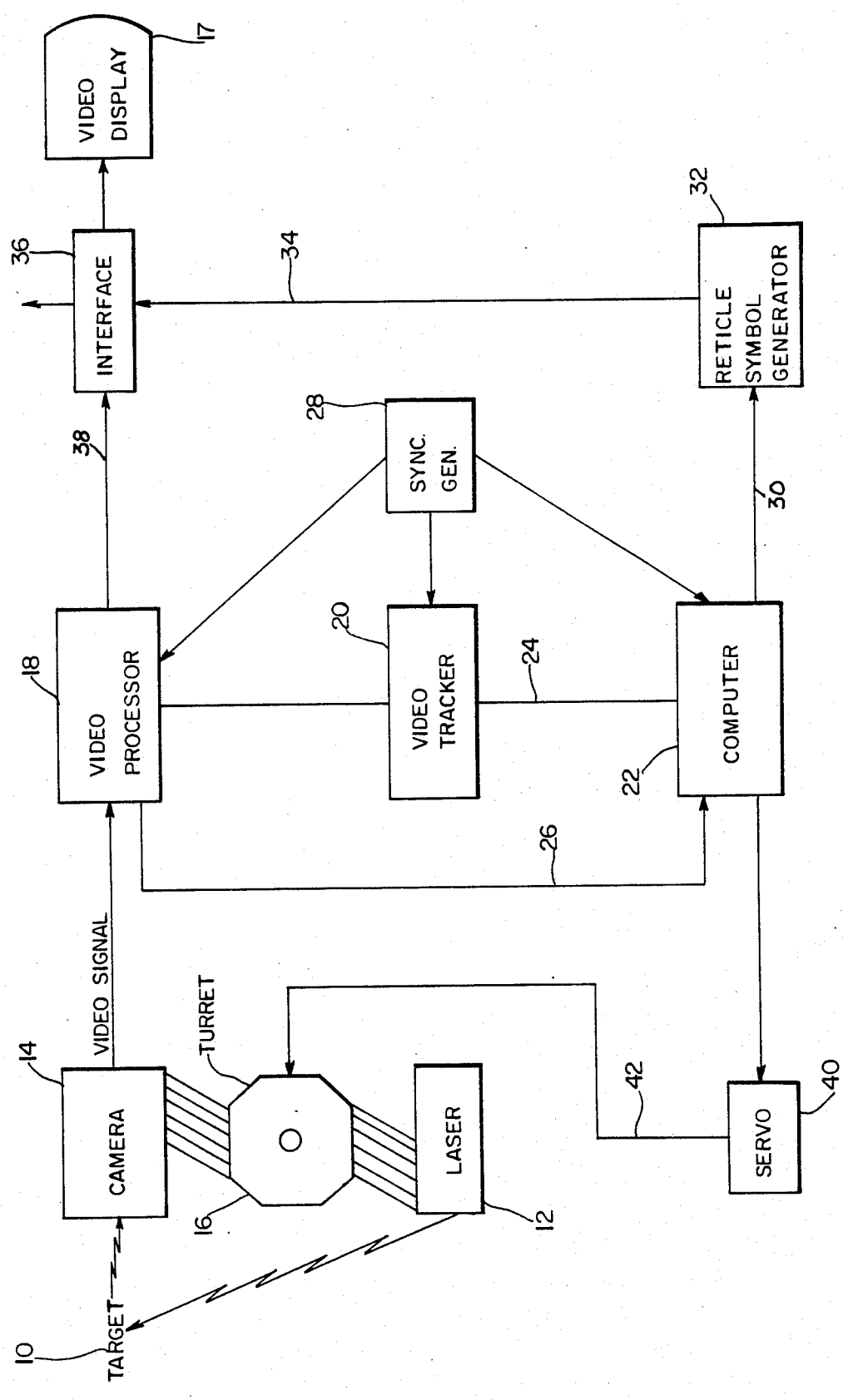
FIG. 1 illustrates a prior art imaging system.

In the prior art an image to be tracked is indicated as target 10. The target is illuminated by a conventional laser source 12 and a camera 14 is directed toward the illuminated target for generating a video signal thereof. The camera 14 may be a vidicon or infrared device. Both the camera 14 and laser 12 are mounted to a turret 16 in a manner ensuring parallel optical paths between the laser beam and the camera received image. The turret turns so as to keep the target 10 illuminated at all times.

A video processor 18 receives the video signal from camera 14 and properly formats the data therein. The video data is then input to a video tracker 20 which locates and tracks the illuminated target within a field of view. The output from the video tracker 20 forms a first input 24 to a computer 22 which stores target coordinate data. The second input 26 of computer 22 receives data directly from the output of video processor 18 and a third input to the computer is connected to the synchronization generator 28 which serves as a clock for the computer as well as the video tracker 20 and the video processor 18. A first output 30 of computer 22 feeds positional data to a reticle symbol generator 32.

An interface 36 is connected at a first input 38 to the output of video processor 18 and at a second input 34 to the output of reticle symbol generator 32 so as to superimpose the reticle and the illuminated target for display by a video display 17, connected to the output of interface 36. Typically, the video display 17 will be a CRT monitor. Computer 42 generates an error signal representing the target shift and laser beam position. The error signal inputs to servo 40, the output 42 of the servo drives the turret 16 to maintain tracking contact with the target.

Figure 2A:
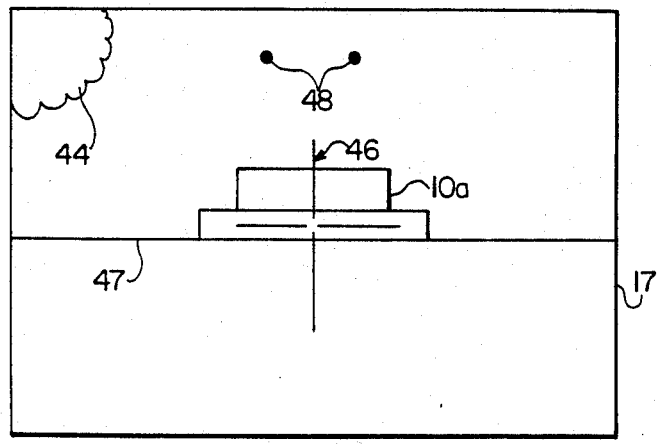
FIG. 2A is a symbolic representation of an illuminated image with a superimposed reticle thereon.

Thus far described, the system of FIG. 1 is a prior art system. To appreciate the actual type of display seen on video display 17, reference is made to FIG. 2A wherein an illuminated scene is diagrammatically illustrated. A target, for example, a tank 10a is illustrated relative to the ground plane 47. A background cloud 44 may also be illuminated as part of the scene. The illuminated scene is imaged by camera 14 and processed as discussed in connection with FIG. 1. Reticle 46 in FIG. 2A is generated by the reticle symbol generator 32, as discussed in connection with FIG. 1. Under normal circumstances, when the prior art system of FIG. 1, is operating properly, it will superimpose the reticle 46 over the center of the illuminated scene and, thus, a control operator will see the reticle in a proper boresight position with respect to tank 10a.

Figure 2B:
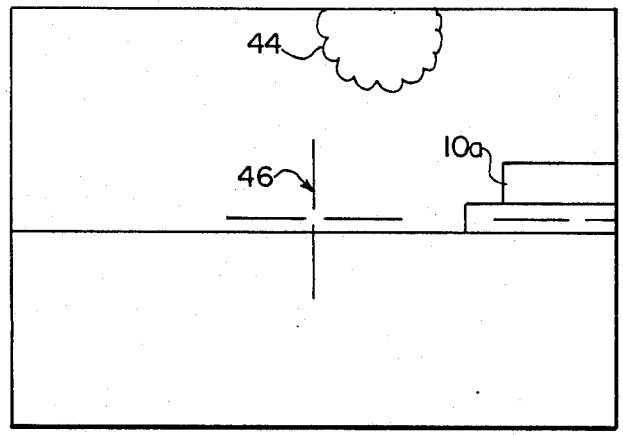
FIG. 2B is a view similar to that of FIG. 2A but indicating an erroneously shifted image due to external high magnetic fields which cause boresight error.

However, as previously discussed, high energy magnetic or other fields external of the system may cause the deflection circuits of camera 14 to shift the scene that the camera picks up, as indicated by the shifted position of tank 10a and cloud 44 as shown in FIG. 2B. Since the reticle symbol generator 32 generates a reticle 46 independently of the camera imaged scene, the reticle no longer lies superimposed over the tank 10a as it should; and therefore, a line-of-sight error exists.

Figure 2C:
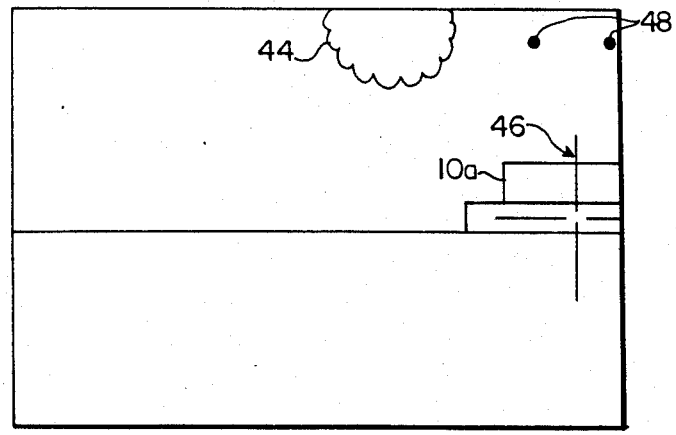
FIG. 2C is a view similar to that of FIG. 2B but with the position of the reticle compensated for due to the referencing of the reticle to fiducial marks, in accordance with the present invention.

The purpose of the invention is to compensate for the erroneously displaced position of reticle 46. FIG. 2C demonstrates the effect that the present invention has. Namely, the reticle 46 is shifted to compensate for the erroneously displaced target thereby presenting accurate boresight data to a weapon control operator. This is done by maintaining a fixed positional relationship between the reticle 46 and the indicated fiducial marks 48. In the present invention, the fiducial marks are physically applied to the faceplate of the camera, as will be explained hereinafter, so that these fiducial marks will "travel" with the tank 10a. If the reticle could be positionally referenced with respect to the fiducial marks 48 while the system is operating, the erroneous displacement between the reticle and tank 10a (FIG. 2B) can be compensated, as shown in FIG. 2C. Thus, whether the target is centered on the display, as in FIG. 2A, or shifted due to a high powered external magnetic field, such as in FIG. 2C, the reticle will maintain its superposition relative to the target.

FIG. 3A illustrates a first embodiment for physically placing the fiducial marks 48 (FIGS. 2A and 2C) on the faceplate of a camera by means of fiber optics. An LED 50 serves as a light source which is split and transmitted through two optic fibers 52 and 54 optically connected at first ends thereof to the LED 50 and directed at their other ends to impinge transmitted light to two points in area 56 on the faceplate 58 of the camera 14. A better view of this is seen in FIG. 3B wherein the points of attachment 60, 62 of the optic fibers to faceplate 58 define and create fiducial marks illuminated to appear on the display. The LED are powered on and off with the system power.

FIG. 3C illustrates a second embodiment of the invention wherein the fiducial marks are simply painted onto the faceplate of the camera in vicinity 64 of the faceplate. FIG. 3D illustrates the two painted marks 66 and 68 at those points where optic fiber points of attachment 60, 62 were previously connected as discussed in connection with FIG. 3A.

Although FIGS. 3A and 3C discuss two means of imparting fiducial marks to a camera faceplate, this is by no means restrictive. As will be appreciated, the fiducial marks may be applied to the faceplate in a number of inexpensive and effective ways so that the reticle can be maintained properly superimposed over a target, as previously discussed in connection with FIG. 2C.

Referring to FIG. 1, the improved operation of the present system when compared to the prior art will now be discussed in greater detail.

Periodically, the system is initialized by placing it in a boresight mode during which time the system is not operating on an actual target but is conditioned to sense a spot projected by laser 12. Camera 14 picks up the boresight spot and supplies boresight video data to the video processor. The video processor routes the signal to the video tracker and the latter acquires and tracks the boresight spot from the laser as well as the fiducial marks. Subsequently, the video tracker sends the boresight spot data and the fiducial mark locations to computer 22, which typically is in the form of a microprocessor. Next, the computer determines the placement of the boresight spot relative to the fiduciary marks and the computer stores fiducial mark location and generates a reticle over the boresight spot location, the appropriate coordinates being stored in the computer. The video display 17 displays the boresight image and reticle.

When the present system is used in a tactical situation, the system is taken out of the boresight mode and camera 14 is set to view a target so that it generates target video data for the video processor and from there the video processor signals are routed to the video tracker. After the video tracker acquires and tracks the target, it sends data point information to the computer 22. The video tracker 20 then acquires and tracks fiducial mark data and sends data point information to the computer 22. The computer determines the shift between the fiducial marks and the vertical/horizontal sync pulses. These may be variable due to external magnetic fields as previously discussed. After computation of this displacement, the system shifts the boresight spot reticle position (generated by reticle generator 32) and the tracker null point to compensate for the electro-magnetic, thermal or other induced shifts.

By using fiducial marks reference points may be fed into the vertical overscan portion of the video. The location of these points (i.e., time from start of the video scan to the reference point) may be read and stored into the computer. As the video is displaced, the center of field view will move with respect to a distribution point. This point, in the form of a reference white or black level, will then be used (via timing differences) to determine the extent of image motion. More specifically, if the boresight reticle is referenced to the fiducial point, corrections to the location of the reticle may be continuously implemented to offset disturbances.

One fiducial point could be used in order to compensate for first order effects. However, disturbances due to external magnetic fields may also cause angular rotation of the image about the nominal center of the vidicon camera faceplate so that a minimum of two fiducial points is required.

The fiducial mark system discussed hereinabove has the added capability of reducing boresight error in other areas as well. These areas are:
(1) image motion due to vidicon raster stability;
(2) image motion due to focus change;
(3) image motion due to increased heating-induced window wedge;
(4) image motion due to thermal sensitivity.

It should be understood that the invention is not limited to the exact details of construction shown and described herein for obvious modifications will occur to persons skilled in the art.

I claim:

1. In a video system having a camera for imaging a scene, the improvement comprising:
   means connected to an output of the camera for tracking displacement of a moving image in the scene;
   computing means connected to the tracking means for storing positional data of the moving image;
   means for generating a reticle superimposed on a central point of the image;
   interfacing means for combining video signals from the computing means and the generating means in order to form a combined signal, on a display, of the image and the reticle superimposed thereon; and at least one fiducial mark applied to the faceplate of the camera, the computing means further ensuring a fixed preselected relationship between the displayed reticle and the fiducial mark which in turn ensures proper positioning of the displayed reticle over the image.

2. The subject matter of claim 1 wherein at least two fiducial marks are employed to compensate for angular shift of the image relative to the reticle.

3. The structure set forth in claim 1 wherein the fiducial mark is produced by:
   a source of light; and
   an optic fiber extending between the source and the faceplate, light from the fiber imposing a light dot on the faceplate which serves as the fiducial mark.

4. The structure set forth in claim 1 wherein the fiducial mark is produced by a painted dot applied directly to the faceplate.

5. A boresight video imaging system comprising:
   a laser source of light for illuminating a target;
   a camera directed in a parallel direction with the source for viewing the illuminated target;
   means for mounting the source and the camera in parallel relation;
   means connected to an output of the camera for tracking displacement of a moving target;
   computing means connected to an output of the tracking means for storing positional data of the moving target;
   means connected to an output of the computing means for generating a reticle superimposed on a central point of the target;
   interfacing means for combining video signals from the computing means and the generating means in order to form a combined signal, on a display, of the target and the superimposed reticle;
   at least one fiducial mark applied to the faceplate of the camera enabling the computing means to maintain a preselected fixed relationship between the displayed fiducial mark and the reticle which in turn ensures proper positioning of the display reticle over the target; and
   servo means connected between an output of the computing means, and an input of the mounting means for repositioning the mounting means as the tracked target moves thereby continually illuminating and tracking the target.

6. The structure set forth in claim 5 wherein at least two fiducial marks are employed to compensate for angular shift of the target image relative to the reticle.

7. The subject matter set forth in claim 5 wherein the fiducial mark is produced by:
   a source of light; and
   an optic fiber extending between the source and the faceplate, light from the fiber imposing a light dot on the faceplate which serves as the fiducial mark.

8. The subject matter set forth in claim 5 wherein the fiducial mark is produced by a painted dot applied directly to the faceplate.

9. A method for accurately tracking an illuminated target including the steps:
   sighting a camera in a direction of the target;
   tracking the sighted target as it moves;
   storing the positional coordinates of the tracked target;
   generating a video signal of a reticle;
   superimposing the reticle and the tracked target at the same positional coordinates;
   applying at least one fiducial mark to a faceplate of the camera;
   computing a fixed distance between said fiducal mark and the reticle;
   maintaining the fixed distance therebetween;
   displaying the superimposed reticle and target.

10. A method for accurately boresighting a moving target comprising the steps:
    mounting a laser light source and imaging camera on a common movable turret and optically directed in parallel paths;
    tracking a sighted illuminated target as it travels;
    storing the positional coordinates of the tracked target;
    generating a reticle video signal;
    superimposing the reticle and the tracked target at the same positional coordinates;
    applying a plurality of fiducial marks to a faceplate of the camera;
    computing a fixed distance between the fiducial marks and the reticle;
    maintaining the fixed distance therebetween;
    displaying the superimposed reticle and target.

11. The method set forth in claim 10 together with the steps of computing shifts in the positional coordinate of moving target; and
    moving the turret in the direction to continue illumination of the target as it moves.

* * * * *